US 8,681,246 B2

(12) United States Patent
Bocking et al.

(10) Patent No.: US 8,681,246 B2
(45) Date of Patent: Mar. 25, 2014

(54) CAMERA WITH MULTIPLE VIEWFINDERS

(75) Inventors: Andrew Bocking, Waterloo (CA);
Russell Andrade, Kitchener (CA)

(73) Assignee: BlackBerry Inc., Waterloo, Ontario (CA)

( * ) Notice: Subject to any disclaimer, the term of this patent is extended or adjusted under 35 U.S.C. 154(b) by 0 days.

(21) Appl. No.: 13/412,724

(22) Filed: Mar. 6, 2012

(65) Prior Publication Data

US 2013/0063626 A1 Mar. 14, 2013

Related U.S. Application Data

(63) Continuation of application No. 11/695,074, filed on Apr. 2, 2007, now Pat. No. 8,154,625.

(51) Int. Cl.
*H04N 5/262* (2006.01)

(52) U.S. Cl.
USPC .................................. 348/240.2; 348/333.01

(58) Field of Classification Search
None
See application file for complete search history.

(56) References Cited

U.S. PATENT DOCUMENTS

| 6,947,082 | B2 * | 9/2005 | Gomi ........................ 348/240.2 |
| 2003/0016942 | A1 * | 1/2003 | Tojo et al. ...................... 386/46 |
| 2004/0061797 | A1 | 4/2004 | Takahashi et al. |
| 2004/0189831 | A1 * | 9/2004 | Shibatani et al. ........ 348/240.99 |
| 2005/0041132 | A1 * | 2/2005 | Juen et al. ................. 348/333.12 |
| 2005/0083351 | A1 * | 4/2005 | Kawamoto et al. ........... 345/660 |

OTHER PUBLICATIONS

U.S. Appl. No. 11/695,074 filed Apr. 2, 2007—Camera With Multiple Viewfinders.
Corresponding European Patent Application No. 11 157 835.7 Examination Report dated Sep. 11, 2013.

* cited by examiner

*Primary Examiner* — Lin Ye
*Assistant Examiner* — Dennis Hogue
(74) *Attorney, Agent, or Firm* — Perry + Currier Inc.

(57) ABSTRACT

A method and apparatus for controlling the display of a portable electronic device having a camera application, a viewfinder having at least two viewfinder resolutions, and a sensor array, is provided. When a zoom level of the camera application is 1×, a first image is generated by scaling a predetermined number of rows and columns of pixels of the sensor array to a first viewfinder resolution at a given frame rate. When the zoom level is greater than 1×, a region of interest of the predetermined number of rows and columns of pixels is cropped in accordance with the zoom level and a second image is generated by scaling the cropped region of interest to a second viewfinder resolution smaller than the first viewfinder resolution at a frame rate higher than the given frame rate.

19 Claims, 8 Drawing Sheets

CAMERA WITH MULTIPLE VIEWFINDERS

CROSS REFERENCE TO RELATED APPLICATION

This application is a continuation of U.S. application Ser. No. 11/695,074 filed Apr. 2, 2007, the contents of which are incorporated herein by reference.

FIELD

The present disclosure relates generally to digital cameras and more particularly to a digital camera with multiple viewfinders, adapted for use within a portable electronic device.

BACKGROUND

Portable electronic devices continue to get smaller and incorporate more functions, such as traditional personal digital assistant ("PDA") functionality with cellular telephony and wireless email capability. In addition to functions oriented toward the business user, it is also known to incorporate music and video players as well as camera applications for consumer market devices.

Conventional film cameras use a photosensitive film to capture an image, whereas digital cameras use electronic photosensors such as charge coupled device (CCD) or complimentary metal oxide semiconductor (CMOS) chips. The term "photosensor" as used in this specification means any device(s) or material(s) capable of receiving and capturing radiant energy, and being at least partially capable of converting the radiant energy into electronic signals that become a virtual representation of the optical image. A CCD or CMOS "camera-on-a-chip" includes an array of very fine electronic "picture elements" or "pixels" arranged in horizontal rows and vertical columns that define an image resolution matrix.

U.S. Pat. No. 5,841,126 describes an exemplary camera chip that may be incorporated into a portable electronic device.

Most camera applications utilize a "rolling shutter" mechanism for clocking out successive rows of pixels from the array. Typically, the rows of pixels are refreshed or reset in sequence, starting at the top of the image and proceeding row by row to the bottom. When this refresh process has progressed a predetermined distance down the image, the readout process begins, wherein data from rows of pixels are read out in sequence, starting at the top and proceeding row by row to the bottom in the same manner and at the same speed as the refresh process.

The rate at which the pixel data is clocked out depends on three factors: 1) frame size (larger resolutions require higher clock rates); 2) frame rate (higher frame rates require higher clock rates; and 3) amount of digital zoom applied (higher zoom levels require higher clock rates).

Data clocked out of the array at high data rates places significant demands on baseband processing capabilities. Also, there is a practical limit to the rate at which the baseband processor can accept data from the photosensor array. Baseband processing capabilities therefore play an important role in determining the size of the camera viewfinder. In this specification, the term "viewfinder" refers to a digital viewfinder, implemented as a software application executed by a processor, in conjunction with the photosensor array and a display. The software application mimics the function of an optical viewfinder that is used on a conventional camera.

Optimizing one of the three factors discussed above results in limitations being imposed on the other two factors. Thus, a larger viewfinder provides better aesthetics at the expense of a slower frame rate (or refresh rate) and lower zoom level. Conversely, a smaller viewfinder provides higher frame rate and/or zoom level at the expense of aesthetics.

BRIEF DESCRIPTION OF THE DRAWINGS

Embodiments, which are purely exemplary, will now be discussed with reference to the attached Figures in which.

DETAILED DESCRIPTION OF THE EMBODIMENTS

As discussed in greater detail below, according to an aspect of this specification, a portable electronic device is set forth with a camera application having user-selectable multiple viewfinders. By activating a smaller viewfinder, the application provides the user with a higher refresh rate and greater digital zoom, whereas activation of a larger viewfinder provides the user with a larger viewing area. The larger viewing area also provides better visibility in low lighting conditions, but restricts the maximum refresh rate that can be used due to bandwidth considerations. As an example, 20 fps at 240*180 may be equivalent to 15 fps 320*240 from a bandwidth perspective. Higher refresh rates are advantageous in bright lighting conditions for minimizing blurriness. Thus, a 240*180 viewfinder at 20 fps will present a less blurry image than a 320*240 at 15 fps in good lighting, and is aesthetically preferable.

In low light conditions, however, the camera frame rate will decrease in any event in order to gather more light on the sensor. Thus, in a dimly lit room, for example, the camera may have to adjust its frame rate to 8 fps in order to properly expose the sensor. In such a case, the 320*240 viewfinder does not provide any disadvantage whatsoever with respect to a 240*180 viewfinder, since 8 fps falls within the allowable range of both. In such a case, then, the 320*240 viewfinder provides the user with a better viewing experience.

Figure 1:
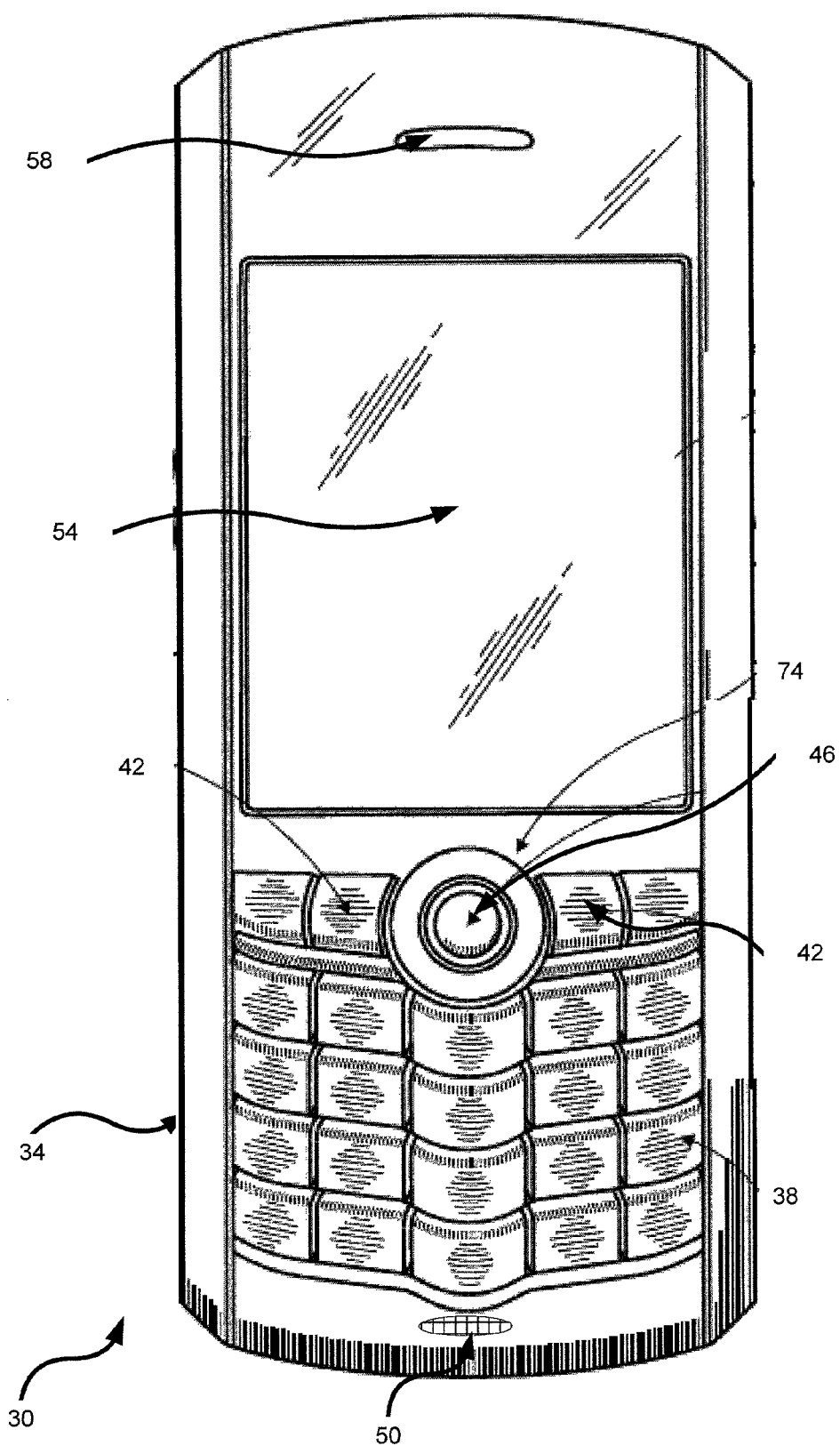
FIG. 1 is a schematic representation of a front view of a portable electronic device in accordance with an embodiment.

Referring now to FIG. 1, a front view of a portable electronic device in accordance with an embodiment is indicated generally at 30. In a present embodiment, device 30 includes the functionality of a wireless telephone, a wireless email paging device and a digital camera.

As best seen in FIG. 1, device 30 includes a housing 34 that frames a plurality of input devices in the form of a keyboard 38, a set of keys 42 (one of which may be a menu key), a trackball 46 and a microphone 50. Housing 34 also frames a plurality of output devices in the form of a display 54 and a speaker 58.

Accordingly, a user of device 30 can interact with the input devices and output devices to send and receive emails, conduct voice telephone calls, manage appointments and contacts, browse the Internet, and perform such other functions as can be found on a known or as-yet unconceived electronic device such as device 30.

It is to be understood that device 30 is simplified for purposes of explanation, and that in other embodiments device 30 can include, additional and/or different functions and/or applications, and include input and output devices accordingly. Such other functionality can include music playing, audio recording and video playing. An example of a combined input/output device would include a Universal Serial Bus ("USB") port, a headset jack to connect a handsfree headset to device 30, or a Bluetooth™ (or equivalent technology) transceiver. Likewise, it will be understood from the teachings herein that certain functions included in device 30 can be omitted.

Figure 2:
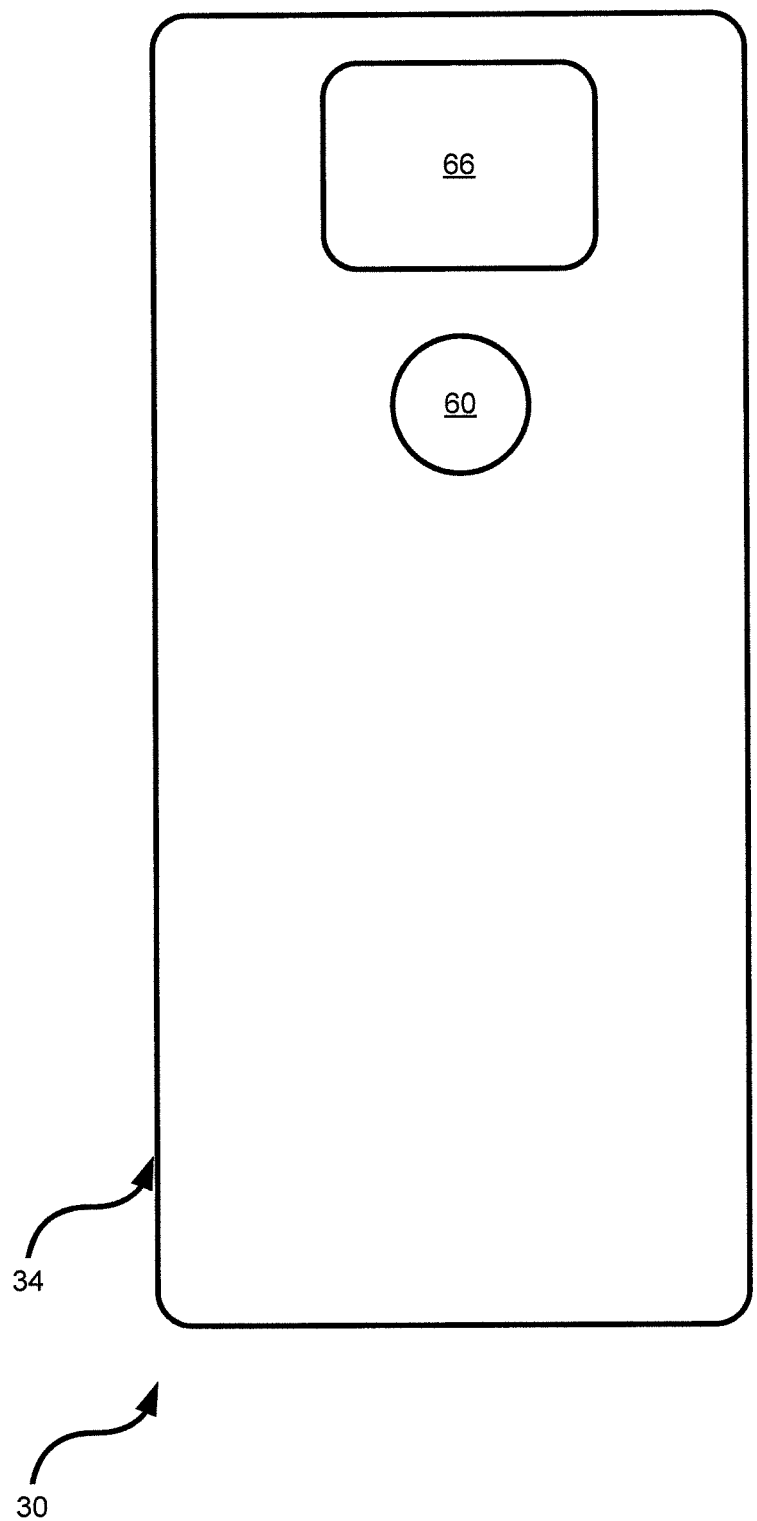
FIG. 2 is a schematic representation of a rear view of the portable electronic device of FIG. 1.

In a present embodiment, device 30 also includes a camera. Referring now to FIG. 2, a rear view of device 30 is shown. Device 30 thus also includes an additional input device in the form of a camera lens 60 and an additional output device in the form of a flash 66. As discussed in greater detail below with reference to FIGS. 3 and 4, lens 60 focuses light on image capturing photosensor chip 62, which incorporates an array of photosensitive elements, for creating an electronic signal of the image that impinges thereon via the camera lens 60.

In one embodiment, the form factor of device 30 is constructed so that a user can grasp device 30 with either a left hand, or right hand, and be able to activate keys 42 and trackball 46 with the thumb. (While trackball 46 is configured for the thumb, it should be understood that users can use other digits on their hands as well). By the same token, lens 60 and photosensor chip 62 are disposed behind display 54 so that the index finger of the user, when wrapped around device 30, does not obscure the lens and thereby interfere with the use of device 30 as a camera. The positioning of lens 60 behind display 54 also improves the usability of display 54 as a viewfinder when device 30 is acting as a camera, as the display 54 will present the scenery to the user that is directly behind display 54.

Figure 3:
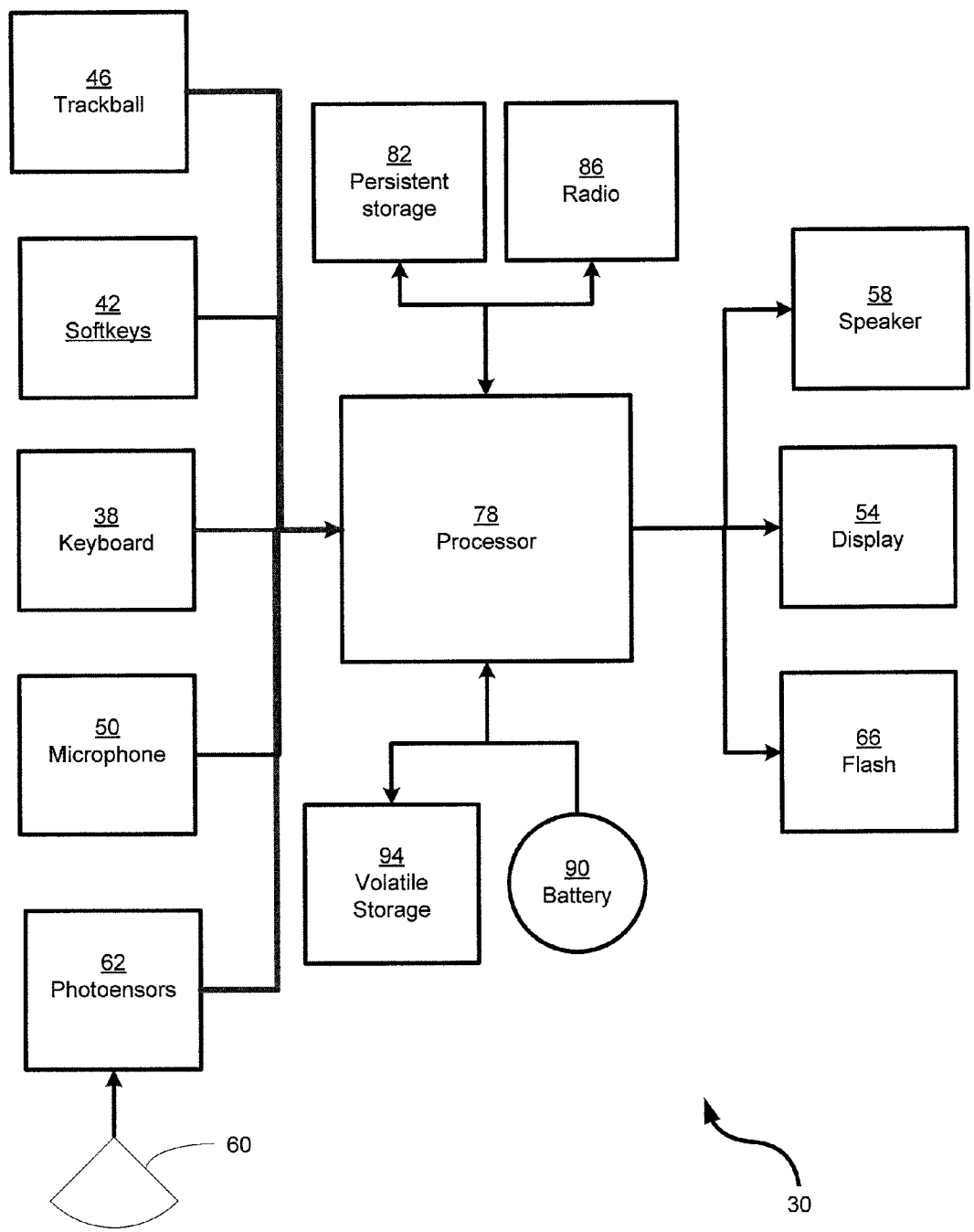
FIG. 3 is a block diagram of certain internal components of the device of FIG. 1.

Referring now to FIG. 3, a block diagram representing certain internal components of device 30 is shown. Device 30 thus includes a processor 78 which interconnects the input devices of device 30 (i.e. trackball 46, keys 42, keyboard 38, photosensor chip 62 and microphone 50) and the output devices of device 30 (i.e. speaker 58, display 54 and flash 66). Processor 78 is also connected to a persistent storage device 82. (Persistent storage device 82 can be implemented using flash memory or the like, and/or can include other programmable read only memory (PROM) technology and/or can include read-only memory (ROM) technology and/or can include a removable "smart card" and/or can be comprised of combinations of the foregoing.) As discussed in greater detail below, processor 78 executes a plurality of applications stored in persistent storage device 82, such as an email application, telephony application, Web-browsing application calendar application, contacts application, camera application and other applications that will be known to a person of skill in the art.

Device 30 also includes a wireless radio 86 disposed within housing 34 that connects wirelessly to one of a network of base stations to provide the wireless email, telephony and Web-browsing application functionality referred to above.

Device 30 also includes a battery 90 which is typically rechargeable and provides power to the components of device 30. In a present, purely exemplary embodiment, battery 90 is a lithium battery having an operating voltage of between about 3.0 Volts minimum to about 4.2 Volts maximum. In FIG. 3, for simplicity battery 90 is only shown connected to processor 78, but it will be understood that battery 90 is connected to any component (e.g. photosensor chip 62, radio 88, display 54 and flash 66) within device 30 that needs power to operate.

Device 30 also includes volatile storage 94, which can be implemented as random access memory (RAM), which can be used to temporarily store applications and data as they are being used by processor 78.

As discussed above, examples of known photosensor chips 62 include charge coupled devices (CCDs) and CMOS devices, which create an electronic signal of the image that impinges thereon via the camera lens 60. As will be known to a person of skill in the art, photosensor chip 62 incorporates an array of horizontal rows and vertical columns of photosensitive pixels that define an image resolution matrix. The maximum resolution of the camera determines the size of the pixel array. Thus, a 1.3 MP camera has a pixel array of dimensions 1280×1024, while a 2 MP camera has a pixel array of dimensions 1600×1200 (actually 1.9 MP). Each pixel also has an image resolution "depth". For example, the pixel depth of the may be 8 bits, wherein the minimum pixel brightness value is 0 and the maximum pixel brightness (saturation) value is 255.

Upon exposure to imaging light from a subject, the lens 60 focuses the light onto the array of photosensor chip 62 which collect discrete light energies or photon charges corresponding to or mapping the photographic subject or object column-by-column, row-by-row, and pixel-by-pixel such that a photon charge representation of the subject is obtained. (Original) The photosensor chip 62 processes the photon charges and converts them into useful digital signals that are clocked out for storage in volatile storage 94.

Figure 4:
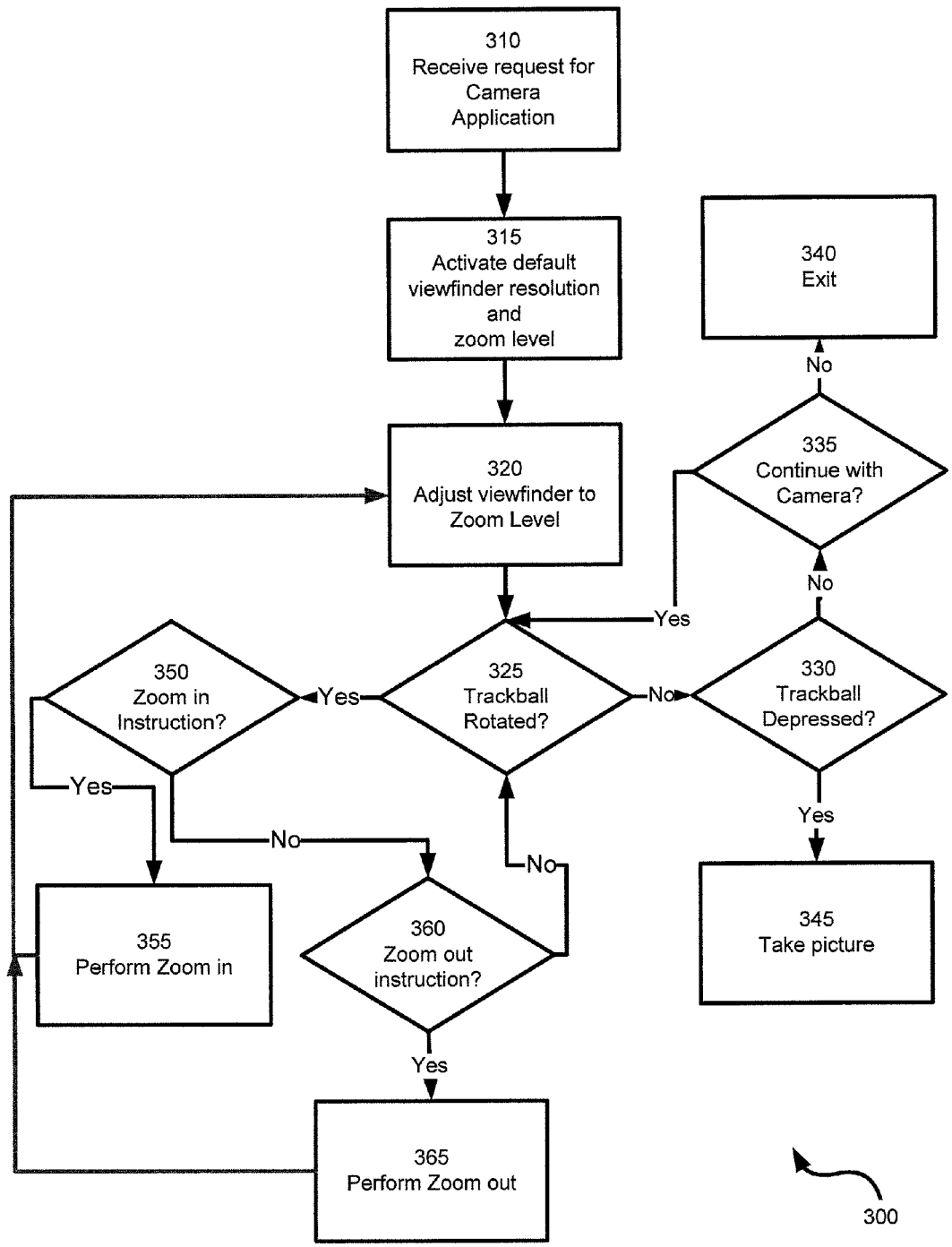
FIG. 4 is a flowchart depicting a method of controlling the display of a portable electronic device in accordance with FIGS. 1-3.

Also, as will be understood by a person of skill in the art, such photosensor devices are incorporated into semiconductor chips that also provide sophisticated scaling algorithms for presenting viewfinders 100 of different resolution. Examples of known scaling algorithms include those set forth in U.S. Pat. No. 5,305,398 to Klein, et al. and U.S. Pat. No. 5,999,663 to Edwards et al. Referring now to FIG. 4 a method of presenting multiple viewfinders (e.g. 240×180 and 320× 240 'full screen') on the display 54 of device 30 is represented in a flowchart and indicated generally at 300. To assist in understanding method 300, the method will be explained in terms of its performance using device 30. However, it is to be understood that this discussion is not be construed in a limiting sense, and that method 300 can be performed on devices other than device 30, and/or that method 300 can be varied.

Beginning at step 310, a request for the camera application is received. On device 30, this step can be effected by user rotation of trackball 46 for scrolling through the various device applications, until the camera application is highlighted. Once highlighted, the user can depress trackball 46 to actually request the camera application. When processor 78 receives an input via trackball 46 that the user desires to use the camera application, method 300 will advance from step 310 to step 315.

Next, at steps 315 and 320, the viewfinder is activated at a default zoom level and resolution. As used herein, the term "zoom" refers to a digital zoom, which is a zooming effect that is accomplished through a software application executing on processor 78. The software application processes images received from photosensor chip 62 and generates corresponding images on display 54 in a manner that is known to those skilled in the art.

Figure 5:
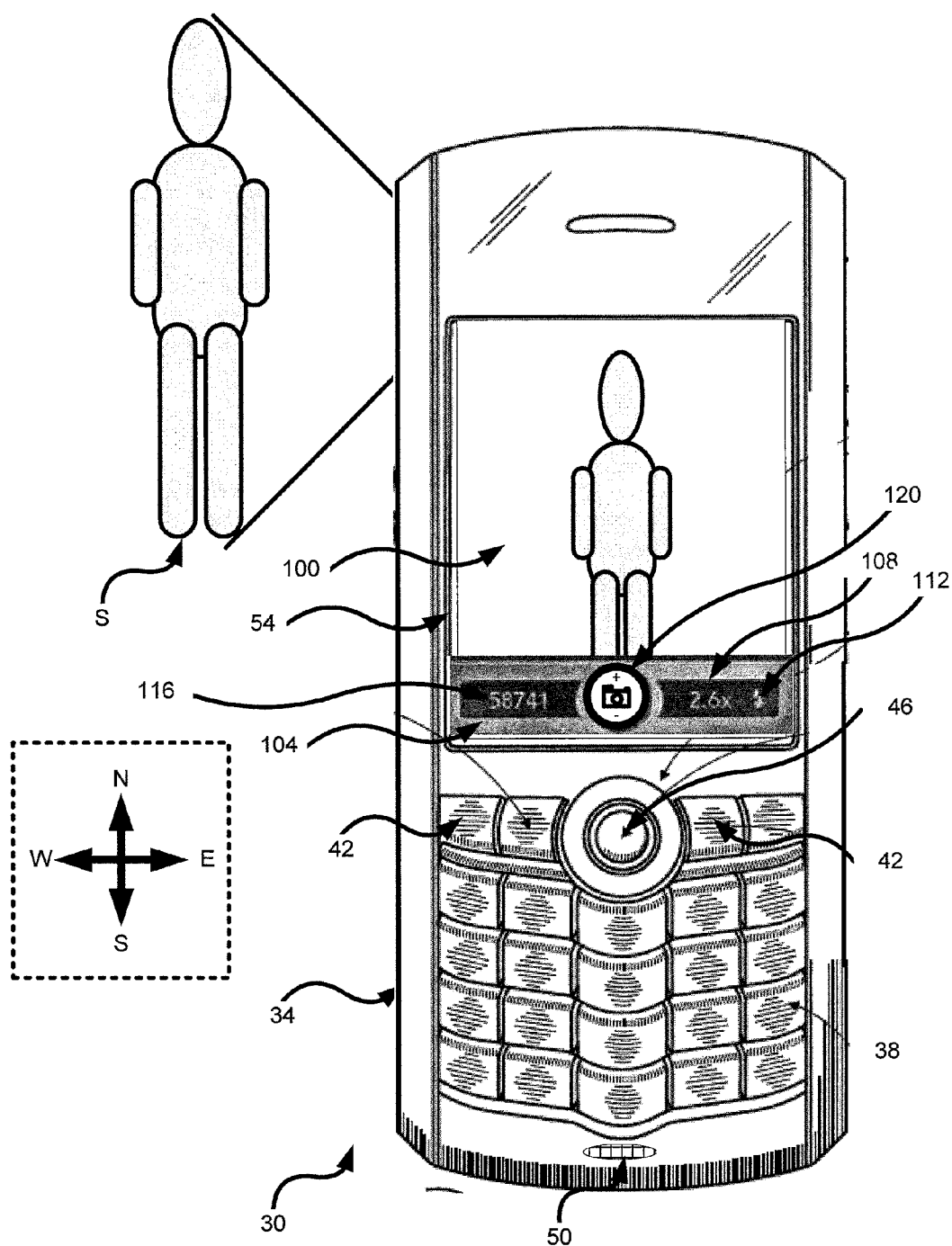
FIG. 5 shows the device in FIG. 1 in relation to a subject to be photographed.

In a present embodiment, the default viewfinder resolution is 240×180 pixels and the default zoom level is set to 2.6× (two-point-six times). Steps 315 and 320 are represented in FIG. 5, where display 54 is shown presenting a viewfinder 100. Viewfinder 100 is implemented by configuring processor 78 to receive an image of subject S through photosensor chip 62 and then generate a representation of that image on display 54. The size of the subject S on viewfinder 100 is consistent with the zoom level of 2.6×, and accordingly, not all of subject S is shown occupying the area of the viewfinder on display 54.

In addition to viewfinder 100, processor 78 is also configured to control display 54 so as to present a status bar 104 thereon. Status bar 104 includes a zoom level indicator 108 and a flash icon 112. Zoom level indicator 108 is thus shown in FIG. 5 with the value "2.6×" indicating the zoom level. Flash icon 112, when active, indicates that flash 66 will fire when the actual picture is taken. Status bar 104 also includes a picture count indicator 116, indicating the number of pictures that can be taken and stored in the memory of device 30. Status bar 104 also includes a shutter control indicator 120.

Shutter control indicator 120 is rendered on display 54 in-line with trackball 46, indicating that actuation of trackball 46 will control the operation of the camera. Shutter control indicator 120 includes an icon in the form of a picture of a camera in the center, representing that if the user depresses trackball 46, then a picture of the subject within viewfinder 100 will be taken and stored.

Next, at step 325, a determination is made as to whether the trackball has been rotated. If no, then method 300 advances to step 330 at which point a determination is made as to whether trackball 46 has been depressed. If "no" method 300 advances from step 330 to step 335 and a determination is made as to whether to continue with the camera function. A "no" determination could be made at step 335 for a variety of reasons. For example, an incoming call could automatically cause the camera function to be discontinued in favour of an application on device 30 that manages incoming calls. Alternatively, the user of device 30 could input a command using keys 42, or keyboard 38, indicating that the user wished to exit the camera application.

Returning to step 330, if, however, trackball 46 is depressed then method 300 advances from step 330 to step 345 at which point an image will be captured of the subject as it appears within viewfinder 100.

Returning to step 325, if, however, trackball 46 is rotated then method 300 advances from step 325 to step 350 At step 350, a determination is made as to whether the rotation of trackball 46 indicates an instruction to "zoom in". In a present embodiment, a determination of "yes" is made at step 350 when trackball 46 is rotated towards shutter control indicator 120. Put in other words, if the directions that can be rotated by trackball 46 are consistent with the cardinal points of the compass, (as shown in FIG. 5) then a "yes" determination is made when trackball 46 is rotated in the "North" direction.

If the determination at step 350 is "no", then at step 360, a determination is made as to whether rotation of trackball 46 indicated an instruction to "zoom out". In a present embodiment, a determination of "no" is made at step 350 when trackball 46 is rotated towards keyboard 38. Put in other words, if the directions that can be rotated by trackball 46 are consistent with the cardinal points of the compass, then a "no" determination is made when trackball is rotated in the "South" direction.

Figure 8:
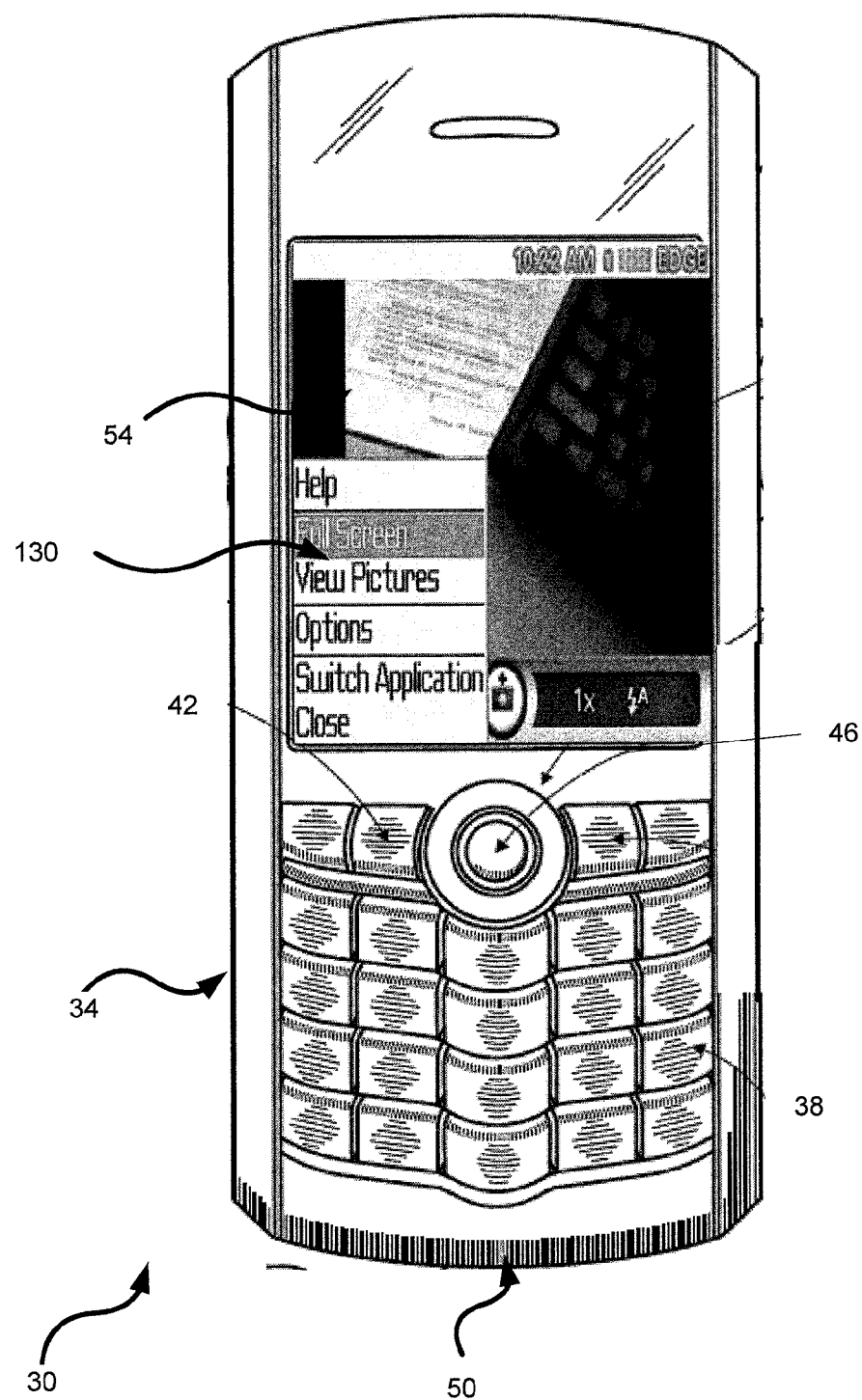
FIG. 8 shows a menu screen on the device in FIG. 1 for selecting a viewfinder resolution.

Steps 355 and 365 are thus reserved for the performance of the actual zoom in or zoom out functions, respectively, the details of which are discussed in detail below with reference to FIG. 8.

At the conclusion of the zooming-in at step 355 (and by extension the return to step 320), the subject S will appear to be closer within viewfinder 100. Likewise, the conclusion of the zooming-out at step 365 (and by extension the return to step 320), the subject S will appear to be farther away within viewfinder 100.

According to an exemplary embodiment, three levels of zooming are contemplated, however it should be understood that any number of levels of zooming can be implemented, provided the photosensor chip 62 is of sufficient resolution. Three levels have, however, in the exemplary embodiment been determined to achieve a high level of usability.

Figure 6:
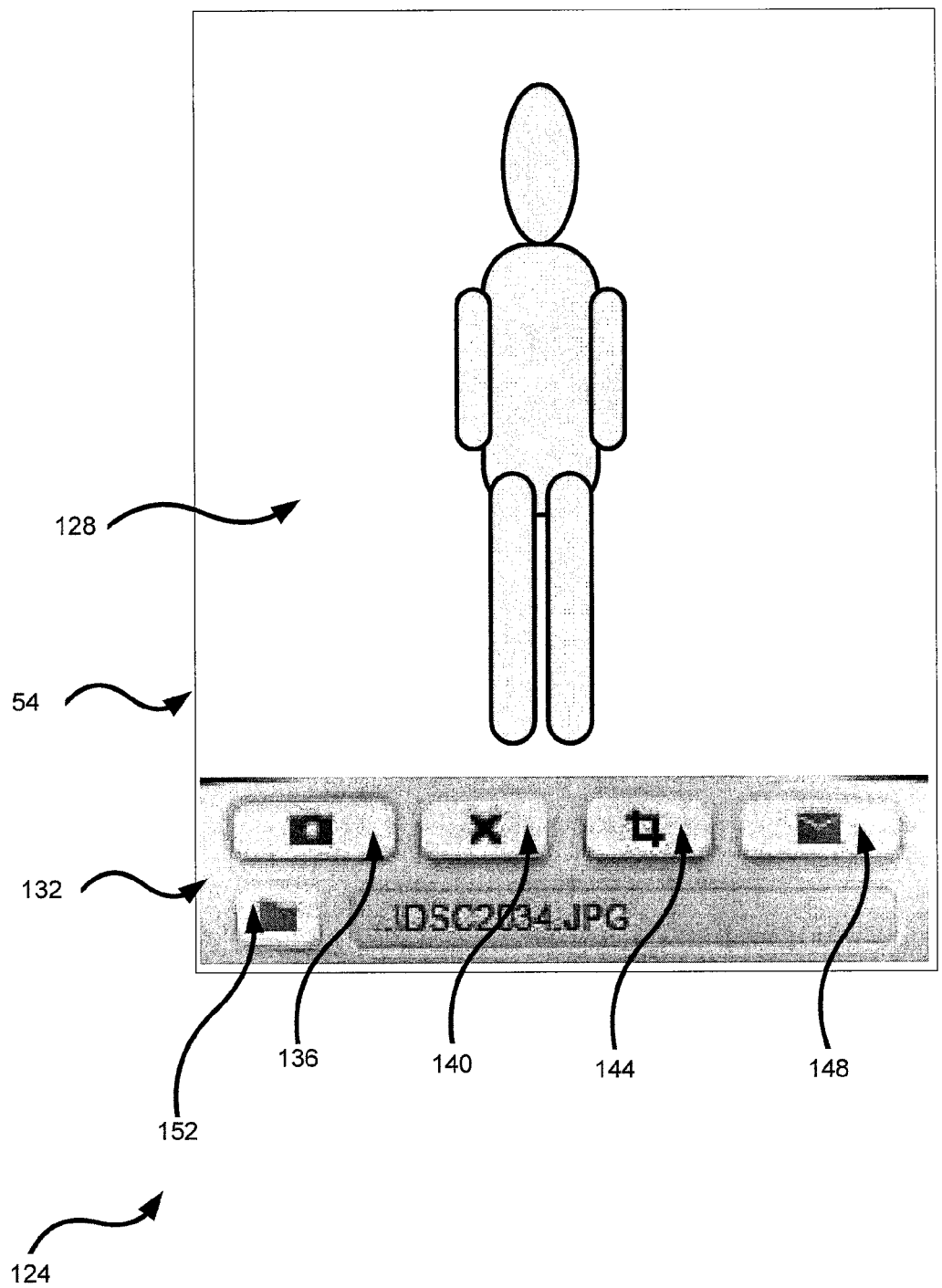
FIG. 6 shows a crop selection screen that can be generated in accordance with another embodiment.

In another embodiment, a novel preview screen is indicated generally at 124 in FIG. 6. Preview screen 124 can be generated by processor 78 on display 54 after, for example, step 345 of method 300 is performed. Thus, in FIG. 6 screen 124 is shown with the picture of subject S taken at step 345 within a picture window 128 in viewfinder 100 along with a preview status bar 132 which replaces status bar 104.

Preview status bar 132 includes five icons, which correspond to four different options that are available to the user. These icons are: return-to-viewfinder 136; delete-picture 140; crop 144; send 148; and file 152. When preview screen 124 is presented after performance of method 300, the picture 124 will have been saved in a file location represented by file icon 152. Return-to-viewfinder 136, as the name implies, leaves the picture shown in picture window 128 saved in persistent storage 82 according to the file name and location represented by file icon 152. Selecting return-to-viewfinder 136 can be used to begin method 300 anew. Delete-picture 140 can be used to delete the picture shown in picture window 128 from persistent storage device 82. Once delete-picture 140 is selected, the picture is deleted and then method 300 begins anew. Crop 144 can be used to select certain portions of the picture stored in picture window 128, and such portions can be saved as new pictures on persistent storage device 82 and/or can be associated with one or more contacts in a contact-manager application that executes on device 30. Send 148 can be used to send the picture within picture window 128 via email, or via multimedia messaging service (MMS) or the like, using the wireless email capabilities of device 30. File 152 can be used to view and/or edit the file name of the picture, and/or browse through other photographs stored on persistent storage device 82 and load them for viewing within preview screen 124.

Individual icons on the preview status bar 132 can be selected by using trackball 46 to sequentially highlight each one of the icons until the desired icon is highlighted, and then depressing trackball 46 to actually select the function associated with that icon.

Figure 7:
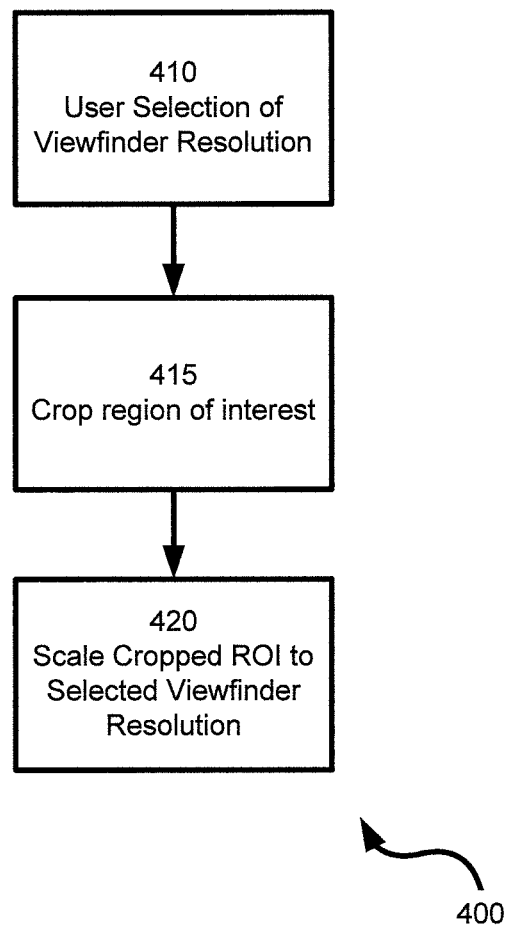
FIG. 7 is a flowchart depicting a method of selecting a viewfinder resolution and performing digital zoom according to an exemplary embodiment.

With reference to FIG. 7, details of the viewfinder resolution selection and zoom functionality of method 300 are set forth according to an embodiment, indicated generally as method 400. Thus, at step 410, the user may select a preferred viewfinder resolution by, for example, activating the menu key (e.g. the key 42 located adjacent and to the left (West) of trackball 46), which causes display of a menu 130 as shown in FIG. 8. The menu 130 provides a list of options based on the application that the user is currently accessing (i.e. in this case, the camera application). If the camera is configured according to the default viewfinder resolution (240×180) then the menu will display a 'Full Screen' option (320×240), whereas if the camera is configured according to the 'Full Screen' viewfinder resolution (320×240) then the menu will display a 'Default' viewfinder resolution option (240×180).

When operating in the viewfinder mode, the photosensor chip 62 automatically scales the image data to the selected viewfinder resolution (i.e. 240×180 or 320×240, as selected at step 410). To perform a digital zoom, (i.e. a YES decision at step 415), a crop region of interest (ROI) is specified as discussed above in connection with FIG. 6, and the selected ROI is cropped (step 420). For example, in order to implement a 2× digital zoom on a photosensor chip 62 incorporating a 1600×1200 pixel array, a 800×600 centre crop is specified. The photosensor chip 62 then, at step 425, scales this region of interest to the selected viewfinder resolution (e.g. 240×180 or 320×240). Because the user sees a cropped region of interest that has been scaled to the selected viewfinder resolution, the user experiences the effect of digital zoom.

If no zoom is selected by the user (i.e. a NO decision at step 415), then the image is scaled (step 425) without any cropping.

As an example, for a 1600×1200 sensor array with a selected viewfinder resolution of 320×240, the following operations are performed by photosensor chip 62. For 1× zoom level (i.e. no zoom), the 1600×1200 image is scaled to 320×240. For a 2× digital zoom, the 1600×1200 image is cropped to 800×600 and then scaled to 320×240. For a 4× digital zoom, the 1600×1200 image is cropped to 400×300 and then scaled to 320×240.

From the foregoing, it will be appreciated that once the cropped region (in pixels) becomes smaller than the selected viewfinder resolution, no more digital zoom can be applied. Thus, with a 320×240 resolution viewfinder approximately 1600/320=5× digital zoom may be provided. With a smaller (240×180) viewfinder, up to 1600/240=6.7 times digital zoom may be provided. However, in practice, due to the manner in which cropping and scaling is typically performed by the photosensor chip 62, the rate at which the image data is clocked out during a digital zoom operation is directly proportional to the amount of zoom being applied. Thus, data at 2× zoom is clocked out at a higher rate than data at 1× zoom, etc. The physical constraints of the baseband processor 78 dictate the maximum clock rate at which the data can be latched into the processor 78. This limitation also dictates the amount of zoom that can be applied. Thus, although it may be theoretically possible to obtain up to 5× zoom with a 320×240 viewfinder, the high clock rates at which the data must be clocked out during a 5× zoom operation may make this unfeasible.

The foregoing represents exemplary embodiments only. Other embodiments and variations are contemplated. For example, it is contemplated that voice activation may be employed (via microphone 50) for the user to control functionality of the camera application, such as zooming (in or out), image cropping, etc., rather than using the trackball 46 and/or keys 42. These and other embodiments are believed to be within the scope of the claims attached hereto.

The invention claimed is:

1. A method in a portable electronic device having a camera application, a viewfinder having at least two viewfinder resolutions, a multidirectional input device, and a sensor array, the method comprising:
   when a zoom level of the camera application is 1×, generating a first image by scaling a predetermined number of rows and columns of pixels of the sensor array to a selected viewfinder resolution at a given frame rate;
   when the zoom level is greater than 1×, and when the selected viewfinder resolution is smaller than a largest viewfinder resolution, cropping a region of interest of the predetermined number of rows and columns of pixels in accordance with the zoom level and generating a second image by scaling the cropped region of interest to the selected viewfinder resolution at a frame rate higher than the given frame rate;
   receiving, from the multidirectional input device, input comprising an indication of the zoom level and a viewfinder resolution; and,
   generating images according to one of either an enlarged or reduced field of view on the viewfinder depending on a direction of the input.

2. The method of claim 1 wherein the selected viewfinder resolution comprises one or more of 240×180 and 320×240.

3. The method of claim 2 wherein the predetermined number of rows and columns of pixels is 1600×1200.

4. The method of claim 3 wherein the 1600×1200 pixels are scaled to 320×240 for a 1× zoom level.

5. The method of claim 3 wherein the 1600×1200 pixels are cropped to 800×600 and scaled to 320×240 for a 2× zoom level.

6. The method of claim 3 wherein the 1600×1200 pixels are cropped to 400×300 and scaled to 320×240 for a 4× zoom level.

7. The method of claim 1, wherein a rate at which image data is clocked out is proportional to an amount of zoom being applied during a digital zoom operation.

8. A portable electronic device comprising:
   a sensor array having a predetermined number of rows and columns of pixels for converting light into electronic signals at a first frame rate;
   a camera application;
   a viewfinder comprising at least two viewfinder resolutions for displaying images for the camera application;
   at least one user input for receiving an indication of the zoom level and a viewfinder resolution, the at least one user input comprising a multidirectional input device; and,
   a processor coupled to the sensor array and the viewfinder and enabled to:
      when a zoom level of the camera application is 1×, generate a first image by scaling a predetermined number of rows and columns of pixels of the sensor array to a selected viewfinder resolution at a given frame rate; and
      when the zoom level is greater than 1×, and when the selected viewfinder resolution is smaller than a largest viewfinder resolution:
      crop a region of interest of the predetermined number of rows and columns of pixels in accordance with the zoom level;
      generate a second image by scaling the cropped region of interest to the selected viewfinder resolution at a frame rate higher than the given frame rate;
      receive input from the multidirectional input device; and,
      generate the images according to one of either an enlarged or reduced field of view on the viewfinder depending on a direction of the input.

9. The device of claim 8 wherein the at least one user input further comprises a microphone for voice activating the processor to generate the images according to one of either the enlarged or reduced field of view of the image on the viewfinder based on user voice commands.

10. The device of claim 8, wherein the at least one user input further comprises a microphone for voice activating the processor to crop the region of interest based on user voice commands.

11. The device of claim 8, wherein the processor is further enabled to receive a signal corresponding to the multidirectional input device being depressed, and, responsive to the signal, capture for saving on a persistent storage device a captured image; the captured image corresponding to an image on the viewfinder.

12. The device of claim 8, wherein the input in a first direction is indicative of zooming-in and input in a second direction is indicative of zooming-out.

13. The device of claim 8, wherein the selected viewfinder resolution comprises one or more of 240×180 and 320×240.

14. The device of claim 8, wherein the predetermined number of rows and columns of pixels is 1600×1200.

15. The device of claim 14, wherein the processor is further enabled to scale the 1600×1200 pixels to 320×240 for a 1× zoom level.

16. The device of claim 14, wherein the processor is further enabled to crop the 1600×1200 pixels to 800×600 and scale the pixels to 320×240 for a 2× zoom level.

17. The device of claim 14, wherein the processor is further enabled to crop the 1600×1200 pixels to 400×300 and scale the pixels to 320×240 for a 4× zoom level.

18. The device of claim 8, wherein a rate at which image data is clocked out is proportional to an amount of zoom being applied during a digital zoom operation.

19. A computer program product, comprising a non-transitory computer usable medium having a computer readable program code adapted to be executed to implement a method comprising:
at a portable electronic device having a camera application, a viewfinder having at least two viewfinder resolutions, a multidirectional input device, and a sensor array, when a zoom level of the camera application is 1×, generating a first image by scaling a predetermined number of rows and columns of pixels of the sensor array to a selected viewfinder resolution at a given frame rate;
when the zoom level is greater than 1×, and when the selected viewfinder resolution is smaller than a largest viewfinder resolution, cropping a region of interest of the predetermined number of rows and columns of pixels in accordance with the zoom level and generating a second image by scaling the cropped region of interest to the selected viewfinder resolution at a frame rate higher than the given frame rate;
receiving, from the multidirectional input device, input comprising an indication of the zoom level and a viewfinder resolution; and,
generating images according to one of either an enlarged or reduced field of view on the viewfinder depending on a direction of the input.

* * * * *

UNITED STATES PATENT AND TRADEMARK OFFICE
CERTIFICATE OF CORRECTION

| | | |
|---|---|---|
| PATENT NO. | : 8,681,246 B2 | Page 1 of 1 |
| APPLICATION NO. | : 13/412724 | |
| DATED | : March 25, 2014 | |
| INVENTOR(S) | : Andrew Douglas Bocking et al. | |

It is certified that error appears in the above-identified patent and that said Letters Patent is hereby corrected as shown below:

On the title page item (73) the assignee "BlackBerry Inc." should read --BlackBerry Limited--

Signed and Sealed this
Fifteenth Day of July, 2014

Michelle K. Lee
*Deputy Director of the United States Patent and Trademark Office*